(12) United States Patent
Kaiser et al.

(10) Patent No.: US 9,131,386 B2
(45) Date of Patent: Sep. 8, 2015

(54) METHOD FOR INTEGRATING A PARTICIPANT INTO A WIRELESS COMMUNICATION NETWORK OF PROCESS AUTOMATION

(75) Inventors: Ulrich Kaiser, Basel (CH); Jorg Reinkensmeier, Steinen (DE); Werner Thoren, Steinen (DE)

(73) Assignee: ENDRESS + HAUSER PROCESS SOLUTIONS AG, Reinach (CH)

( * ) Notice: Subject to any disclaimer, the term of this patent is extended or adjusted under 35 U.S.C. 154(b) by 470 days.

(21) Appl. No.: 12/735,232

(22) PCT Filed: Dec. 15, 2008

(86) PCT No.: PCT/EP2008/067482
§ 371 (c)(1),
(2), (4) Date: Jul. 7, 2010

(87) PCT Pub. No.: WO2009/087016
PCT Pub. Date: Jul. 16, 2009

(65) Prior Publication Data
US 2011/0044242 A1    Feb. 24, 2011

(30) Foreign Application Priority Data
Jan. 9, 2008    (DE) .......................... 10 2008 003 573

(51) Int. Cl.
*H04W 4/00* (2009.01)
*H04W 24/00* (2009.01)
*H04L 29/08* (2006.01)
*H04W 64/00* (2009.01)
*H04W 84/18* (2009.01)

(52) U.S. Cl.
CPC .............. *H04W 24/00* (2013.01); *H04L 67/12* (2013.01); *H04L 67/18* (2013.01); *H04W 64/00* (2013.01); *H04W 84/18* (2013.01)

(58) Field of Classification Search
CPC ..... H04W 24/00; H04W 64/00; H04W 84/18; H04L 67/12; H04L 67/18
See application file for complete search history.

(56) References Cited

U.S. PATENT DOCUMENTS

| 6,414,955 | B1 * | 7/2002 | Clare et al. ............. 370/390 |
| 7,277,414 | B2 | 10/2007 | Younis | |
| 2002/0184304 | A1 | 12/2002 | Meade, II | |

(Continued)

FOREIGN PATENT DOCUMENTS

| DE | 10 2005 059 800 A1 | 6/2007 |
| EP | 1 039 689 A2 | 9/2000 |

(Continued)

OTHER PUBLICATIONS

Dust Networks: Technical Overview of TSMP, white paper Online Jun. 20, 2006 XP 002539053.

(Continued)

*Primary Examiner* — Ayaz Sheikh
*Assistant Examiner* — Hai-Chang Hsiung
(74) *Attorney, Agent, or Firm* — Bacon & Thomas, PLLC

(57) ABSTRACT

A method for integrating a new participant into a wireless communication network of process automation technology, wherein the network has at least one node. The at least one node is selected at least on the basis of a predeterminable criterion, and that the at least one selected node is placed in an integration mode, which enables integration of the new participant into the network.

7 Claims, 1 Drawing Sheet

(56) References Cited

U.S. PATENT DOCUMENTS

2003/0012173 A1    1/2003   Rune
2003/0152041 A1*   8/2003   Herrmann et al. ............ 370/310
2004/0203377 A1*  10/2004   Eaton et al. .................. 455/41.2
2006/0187866 A1*   8/2006   Werb et al. .................... 370/311

FOREIGN PATENT DOCUMENTS

| | | | |
|---|---|---|---|
| EP | 1 566 938 A1 | | 8/2005 |
| EP | 1566938 A1 | * | 8/2005 |
| WO | WO 03/015452 A2 | | 2/2003 |
| WO | WO 03/061176 A2 | | 7/2003 |
| WO | WO 2005/010214 A2 | | 2/2005 |

OTHER PUBLICATIONS

Wenli Chen et al.: "ANMP: Ad Hoc Network Management Protocol", IEEE Journal on Selected areas in communciations, IEEE Service Center, Piscataway, NJ, USA, Aug. 1, 1999, XP0011054994.

* cited by examiner

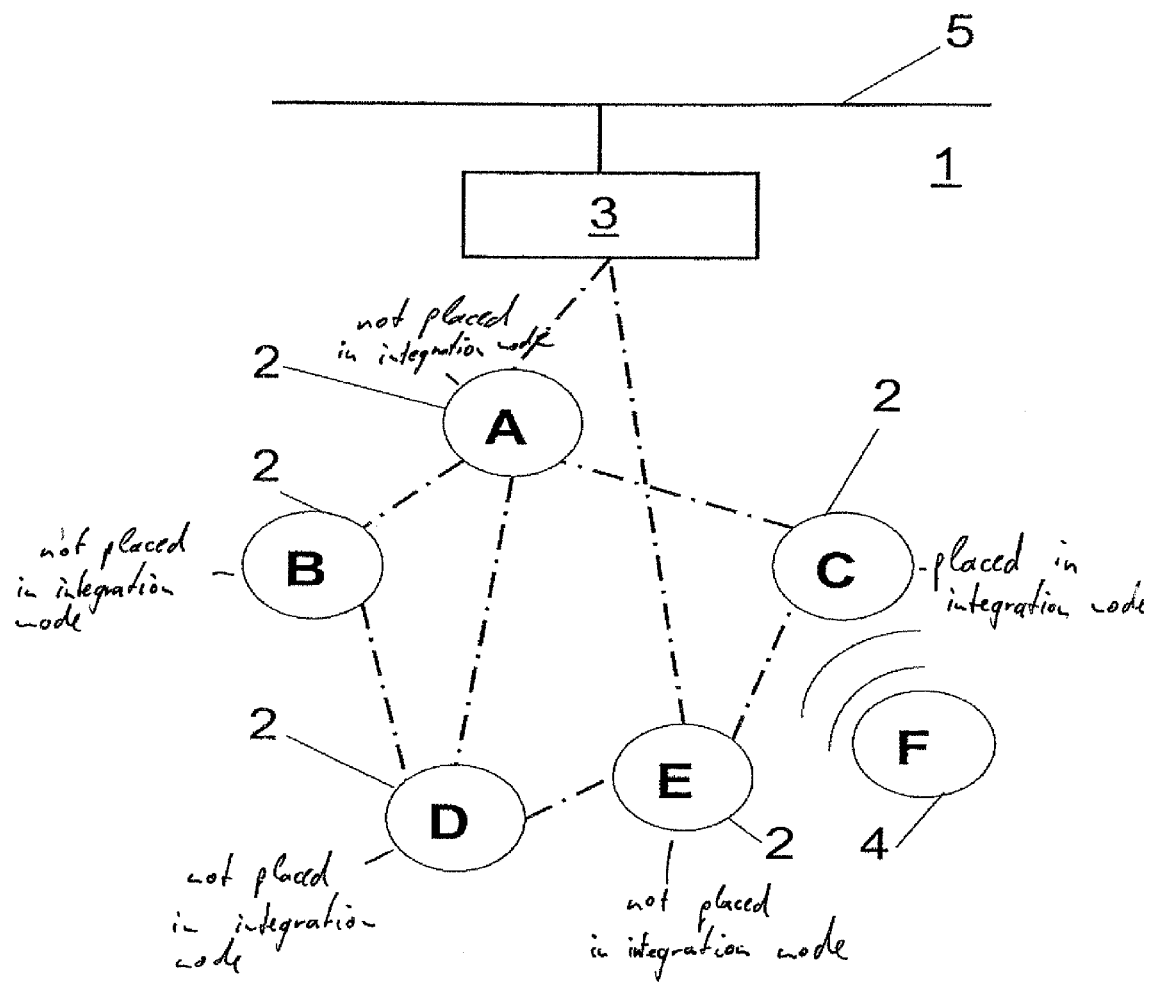

METHOD FOR INTEGRATING A PARTICIPANT INTO A WIRELESS COMMUNICATION NETWORK OF PROCESS AUTOMATION

TECHNICAL FIELD

The invention relates to a method for integrating a new participant into a wireless communication network of process automation technology, wherein the network has at least one node.

BACKGROUND DISCUSSION

In modern installations of process automation, communication between field devices (such as sensors or actuators) and control stations often takes place via radio, wherein, to save energy, self-organizing networks are, in given cases, produced. In such case, communication often takes place only at certain times, since, to save energy, the field devices are usually in sleep mode. In the case of mesh-networks, it is, in such case, usual for two nodes to communicate with one another in a narrow frequency band, their middle frequency changing according to a predetermined pattern (frequency hopping). For the integration of new participants (i.e. new nodes), it is usual that the network continuously reserves a channel in all nodes for integration of further participants. The integration of a new participant itself takes a long time, because the time windows and the frequency must be met. Furthermore, the participants—which, in given cases, are only battery operated—have an increased energy requirement.

An object of the invention is to provide a method for a fast and energy-saving integration of a new participant into an existing wireless communication network.

SUMMARY OF THE INVENTION

This object is achieved according to the invention by the features that at least one node is selected at least on the basis of a predeterminable criterion, and the at least one selected node is placed in an integration mode, which enables the integration of a new participant into the network. The network especially includes a number of (i.e. at least two) nodes. In an additional embodiment, at least two of the plurality of nodes already present in the network are selected and placed in the integration mode.

In an embodiment, the at least one node is selected at least on the basis of furnished or stored data concerning the position of the node. The same is true for the selection of at least two nodes, or exactly two nodes, or exactly one node.

An embodiment provides that the at least one node is selected according to whether its geographical and/or radio distance from the new participant is smaller than the distances of the other nodes of the network from the new participant. A channel for integration of further participants is temporarily reserved only in those nodes which lie in the vicinity of the new participant. From this there results the direct advantage that no demand is made upon the energy supply for the remaining nodes.

In one embodiment, at least two nodes are selected on the basis that their geographical and/or radio distances from the new participant are smaller are than the distances of the other nodes of the network from the new participant. That is to say, two nodes with the shortest distances from the new participant are selected for the integration mode.

An embodiment provides that the at least one selected node is placed in the integration mode only for a predeterminable period of time. The same is true for the at least two selected nodes.

In one embodiment, the integration mode is canceled, as soon as the new participant has been integrated into the network.

An embodiment provides that in the integration mode, the at least one selected node is able to receive signals from the new participant for a predeterminable period of time.

In an embodiment, at least one piece of information concerning the position of the new participant is transmitted.

One embodiment provides that the wireless communication network is a self-organizing radio network.

BRIEF DESCRIPTION OF THE DRAWINGS

The invention will now be explained in greater detail on the basis of the appended drawing, the sole figure of which shows as follows:

FIG. 1 is a schematic representation of a process automation network.

DETAILED DISCUSSION IN CONJUNCTION WITH THE DRAWINGS

FIG. 1 illustrates a network by which the method of the invention for integrating an additional participant 4 into an existing wireless communication network 1 of process automation technology is achieved. In this case, the network 1 is a self-organizing radio network. The network 1 is formed here by five nodes 2, as well as by a network manager 3. The nodes 2 are, for example, field devices (e.g. measuring devices/sensors or actuators), which are designed for communication via radio. That is to say, each of the nodes 2 can be a self-sufficient device. In an additional embodiment, at least one part of the nodes 2 is made up of radio communication units, which are responsible for radio communication for the totality of field devices or plant units present. The network manager 3 is, for example, a computer, which communicates with the network 1, and on which data are stored and/or on which algorithms or programs can run. Here, the network manager 3 is, for example, connected with a process control room via Ethernet.

The individual nodes 2 here are provided with reference characters: A, B, C, D, and E. Radio connections (represented by dot-dashed lines) exist between them. In such case, the time synchronized mesh protocol (TSMP), for example, is used. In association therewith, the nodes 2 (which communicate with one another) are matched with one another with regard to the time slots in which they transmit or receive, and with regard to frequency hopping, i.e. according to which schema they change carrier frequencies.

In the state of the art, there are already a number of options concerning how a new participant 4 can be accepted into an existing, self-organizing, wireless communication network. In such case, the problem lies in the fact that the new participant 4 must know or meet the frequency hopping behavior and the time slot of the nodes 2 already present. Therefore, in one embodiment, the existing nodes 2 in each case hold open a time range, in which they listen for radio signals of possible new participants. In an additional embodiment, the new participant 4 must listen to the radio traffic and deduce from this which time slot (or which frequency hopping) is optimal, in order for it to be able to integrate itself into the existing network 1.

The invention offers a fast and energy saving method: The positions of the individual nodes 2 as well as the locality of the new participant 4 are, in such case, known to the network manager 3. For this purpose, the data are, for example, transmitted to the manager 3 during installation. Proceeding from this state of affairs, the network manager 3 ascertains which node 2, or which nodes 2, is/are located in the vicinity of the new participant 4. In such case, vicinity can be determined by geometric distance. Vicinity can, however, also be defined by an (as low-energy as possible) radio connection path. The nodes 2 in the vicinity of the new participant 4 (F) are the nodes C and E. After selecting or determining the present nodes C and E, the network manager 3 places the selected (or located in the vicinity of the new participant 4) nodes C and E in a so-called integration mode. This integration mode is constituted in such a manner, that an integration of a new participant 4 into the network 1 is enabled via the nodes C and E. In such case, this involves, for example, a time window, within which the nodes C and E listen only for signals of transmitting units, and, in the case of an appropriate identification, perform an integration of the new participant 4, i.e. they transmit appropriate integration data to the new participant 4. In such case, the other nodes 2—i.e. those not selected, and also, therefore, those nodes 2 (here: A, B and D) not located in the vicinity of the new participant 4—are not placed in the integration mode. Thus, these nodes A, B and D are not able to accept a new participant 4.

The advantages of the method of the invention are, thus, as follows: Integration is only performed by those nodes 2, which are located in the vicinity of the new participant 4. In this way, it is possible to reduce the energy demands of the radio communication. Furthermore, the integration is only performed, when it should actually take place—in the presence of a new participant 4—and the integration is, moreover, only performed by a very limited number of nodes 2. Thus, it is, in general, not necessary to hold open free spaces or free times for a possible integration.

For implementation of the method of the invention, the network manager 3 must, in turn, be embodied especially in such a manner, that it has available a database regarding the locations of the individual nodes 2; that, moreover, it can, on the basis of the present data, deduce the distance and, respectively, the properties of the vicinity; that it is possible to introduce new positional data into the network manager 3; and that, moreover, the network manager 3 is able to directly access selected individual nodes and to place them in the integration mode. The data concerning the new participant 4 are, for example, either directly transmitted to the network manager 3 via a control room, or via a manual input. In an additional embodiment, the network manager 3 has available the geographical data of the components present and installed in the plant and in the network 1, respectively, so that the new participant 4 can easily be localized via association with the installed component. Thus, if it is known, for example, on which tank a new field device must be placed as a new participant 4, a calculation of the vicinity can then occur from the knowledge concerning the position of the tank. In an additional embodiment, the technician who introduces the new participant 4 into the plant has available a suitable field device for determining the position of the new participant 4 (e.g. a GPS), and for transmitting the associated data to the network manager 3.

The invention claimed is:

1. A method for a fast and energy-saving integration of a new participant into a wireless communication mesh-network of process automation technology, wherein the network has at least two nodes and a network manager, which knows a position of all nodes as well as a locality of the new participant, wherein for the integration of the new participant the mesh-network continuously reserves a channel in all nodes for integration of further participants and the method comprising the steps of:

ascertaining via the network manager which node, or which nodes is/are located in a geographical vicinity of the new participant; and selecting via the network manager at least two nodes, according to whether their geographical and/or radio distances from the new participant are smaller than distances between other nodes of the network and the new participant and placing the at least two selected nodes in an integration mode via the network manager; and integrating the new participant via the at least two selected nodes which are placed in the integration mode, whereas those nodes not located in the geographical vicinity of the new participant are not placed in the integration mode, thereby reducing energy demands of radio communication of the mesh-network.

2. The method as claimed in claim 1, wherein:
at least two nodes are selected at least on the basis of furnished or stored data concerning a position of the nodes.

3. The method as claimed in claim 1, wherein:
the at least two selected nodes are placed in the integration mode only for a predeterminable period of time.

4. The method as claimed in claim 3, wherein:
the integration mode is canceled as soon as the new participant has been integrated into the network.

5. The method as claimed in claim 1, wherein:
in the integration mode, the at least two selected nodes are able to receive signals from the new participant for a predeterminable period of time.

6. The method as claimed in claim 1, wherein:
at least one piece of information concerning position of the new participant is transmitted.

7. The method as claimed in claim 1, wherein:
the wireless communication network is a self-organizing radio network.

* * * * *